(12) United States Patent
Schmidt et al.

(10) Patent No.: US 11,194,045 B2
(45) Date of Patent: Dec. 7, 2021

(54) METHOD FOR MONITORING THE SURROUNDINGS OF A VEHICLE

(71) Applicant: Robert Bosch GmbH, Stuttgart (DE)

(72) Inventors: Juergen Schmidt, Magstadt (DE); Tom Reimann, Bissingen An der Teck (DE); Werner Urban, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/487,756

(22) PCT Filed: Jan. 11, 2018

(86) PCT No.: PCT/EP2018/050652
§ 371 (c)(1),
(2) Date: Aug. 21, 2019

(87) PCT Pub. No.: WO2018/153561
PCT Pub. Date: Aug. 30, 2018

(65) Prior Publication Data
US 2019/0391260 A1 Dec. 26, 2019

(30) Foreign Application Priority Data

Feb. 27, 2017 (DE) .......................... 102017203129.8

(51) Int. Cl.
*B60R 1/00* (2006.01)
*G01S 15/86* (2020.01)
(Continued)

(52) U.S. Cl.
CPC .............. *G01S 15/86* (2020.01); *B60Q 9/008* (2013.01); *B60T 7/12* (2013.01); *G01S 15/931* (2013.01);
(Continued)

(58) Field of Classification Search
CPC .... B60R 1/003; B60R 1/04; B60R 2001/1284
(Continued)

(56) References Cited

U.S. PATENT DOCUMENTS

2005/0231341 A1 10/2005 Shimizu
2011/0140872 A1 6/2011 McClure
(Continued)

FOREIGN PATENT DOCUMENTS

CN 101270983 A 9/2008
CN 108016444 A 5/2018
(Continued)

OTHER PUBLICATIONS

International Search Report for PCT/EP2018/050652, dated Apr. 19, 2018.
(Continued)

*Primary Examiner* — Jeffery A Williams
(74) *Attorney, Agent, or Firm* — Norton Rose Fulbright US LLP; Gerard Messina

(57) ABSTRACT

A method for monitoring the surroundings of a vehicle, the surroundings behind the vehicle being detected with the aid of ultrasonic sensors and with the aid of at least one imaging sensor, a warning signal being output when an object that has a distance to the vehicle smaller than a predefined minimum distance is detected with the aid of ultrasonic sensors, a trailer of the vehicle being recognized with the aid of the imaging sensor, and the warning signal not being output when the object is the trailer recognized by the imaging sensor.

11 Claims, 2 Drawing Sheets

(51) Int. Cl.
*B60Q 9/00* (2006.01)
*B60T 7/12* (2006.01)
*G01S 15/931* (2020.01)
*G06K 9/00* (2006.01)
*B60R 11/04* (2006.01)

(52) U.S. Cl.
CPC .......... *G06K 9/00791* (2013.01); *B60R 11/04* (2013.01); *B60T 2210/32* (2013.01); *G01S 2015/932* (2013.01); *G01S 2015/938* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2013/0100287 | A1* | 4/2013 | Chien | .................... G08G 1/167 |
| | | | | 348/148 |
| 2013/0226390 | A1* | 8/2013 | Luo | .......................... B60D 1/36 |
| | | | | 701/25 |
| 2014/0309888 | A1* | 10/2014 | Smit | .................. B62D 15/0275 |
| | | | | 701/41 |
| 2016/0101730 | A1* | 4/2016 | Shehan | ................. G01S 13/931 |
| | | | | 340/431 |
| 2016/0274228 | A1 | 9/2016 | Cashler | |
| 2018/0061239 | A1* | 3/2018 | Prasad | ............... G06K 9/00791 |
| 2018/0077851 | A1 | 3/2018 | Hatton | |

FOREIGN PATENT DOCUMENTS

| | | | |
|---|---|---|---|
| CN | 108045305 | A | 5/2018 |
| CN | 207931596 | U | 10/2018 |
| CN | 109398237 | A | 3/2019 |
| DE | 102010006521 | A1 | 9/2010 |
| DE | 102012017668 | A1 | 3/2014 |
| DE | 102014107917 | A1 | 9/2015 |
| DE | 102015109940 | A1 | 12/2016 |
| DE | 102016208833 | A1 | 12/2016 |
| EP | 2620326 | A1 | 7/2013 |
| JP | 2007527560 | A | 9/2007 |
| JP | 2010152732 | A | 7/2010 |
| JP | 2012220223 | A | 11/2012 |
| JP | 2017502866 | A | 1/2017 |
| JP | 2017027181 | A | 2/2017 |
| JP | 2017211696 | A | 11/2017 |
| JP | 2018181272 | A | 11/2018 |
| JP | 2018203031 | A | 12/2018 |
| JP | 2019537160 | A | 12/2019 |
| KR | 20160134829 | A | 11/2016 |
| WO | 2015193060 | A1 | 12/2015 |

OTHER PUBLICATIONS

Office Action issued in corresponding Japanese Patent Application No. 2019-546128 dated Jun. 5, 2020.

* cited by examiner

METHOD FOR MONITORING THE SURROUNDINGS OF A VEHICLE

FIELD OF THE INVENTION

The present invention relates to a method for monitoring the surroundings of a vehicle. The present invention furthermore relates to a control unit for carrying out a method of this type. Finally, the present invention relates to a vehicle including such a control unit.

BACKGROUND INFORMATION

It is believed to be understood from the related art that vehicles may monitor their surroundings with the aid of ultrasonic sensors. In this way, it may be prevented, in particular, that the vehicle collides with objects in its surroundings. If, however, a trailer is used with the vehicle this possibility no longer exists according to the related art. Since sensors would always recognize the trailer as an obstacle, monitoring of the surroundings with the aid of ultrasonic sensors at the vehicle is discontinued as soon as a trailer is hooked up.

A method for operating an ultrasonic sensor device is discussed in DE 10 2012 017 668 A1. Here, it is provided that the ultrasonic sensor device is attached to a vehicle, the vehicle pulling a trailer. It is furthermore provided that a control unit compares the measured values of the ultrasonic sensors to estimate whether a reflected ultrasonic signal originates from a trailer or from an obstacle in the surroundings. This makes it possible to estimate the position of the trailer, whereby at least partial monitoring of the surroundings of the vehicle may be continued.

SUMMARY OF THE INVENTION

The method according to the present invention allows for a trailer to be recognized, thus making it possible to continue to use the data of an ultrasonic system. For this purpose, warnings are suppressed that would only be generated by the ultrasonic system due to the trailer, so that the driver of a vehicle only receives those warnings that actually relate to obstacles in the surroundings of the vehicle.

The method according to the present invention for monitoring the surroundings of a vehicle provides that the surroundings behind the vehicle are detected with the aid of ultrasonic sensors and with the aid of an imaging sensor. The surroundings behind the vehicle are to be understood to mean such surroundings that are located behind the vehicle in the usual direction of travel. It is furthermore provided that a warning signal is output when an object that has a distance to the vehicle smaller than a predefined minimum distance is detected with the aid of ultrasonic sensors. The driver is thus assisted with moving the vehicle, since the driver is made aware of the objects behind his/her vehicle. An unintentional collision with the object is thus in particular avoided. The predefined minimum distance corresponds in particular to a detection area of the ultrasonic sensors. It is furthermore provided that a trailer of the vehicle is recognized with the aid of the imaging sensor. The trailer of the vehicle is in particular connected to the vehicle via a trailer hitch and is moved by the vehicle. If such a trailer is present, it may happen that it has a distance to the vehicle smaller than the minimum distance. The trailer would thus give rise to a warning signal, although there is in fact no risk of the vehicle and the trailer colliding. Therefore, the warning signal is not output when the object that would give rise to a warning signal is the trailer recognized by the imaging sensor. It is thus avoided that the driver receives a warning signal that is not justified, since no endangering of the vehicle originates from the trailer. It is thus not necessary to completely deactivate the ultrasonic sensors. Rather, merely a warning signal that would be generated due to the trailer is suppressed. If there are other objects behind the vehicle and if these objects fall below the predefined minimum distance, the driver may still be warned by the warning signal being output.

The further descriptions herein have further refinements of the present invention.

It may be provided that a warning signal is output when it is detected with the aid of ultrasonic sensors that a distance of the object is smaller than a warning distance and the object is the trailer recognized by the imaging sensor. The warning distance may be smaller than the minimum distance. Since it may occur that the trailer is situated at an angle with regard to the vehicle, in particular when driving backward, there may in general be the risk of a trailer section colliding with the vehicle. For this reason, that warning distance is defined that may correspond to a minimum distance of the ultrasonic sensors that is at least necessary to detect objects. If this distance is fallen below it is generally to be assumed that the trailer is approaching the vehicle and therefore represents a risk to the vehicle. A warning signal is thus output, so that the driver of the vehicle may be made aware of the situation.

In one advantageous specific embodiment, a direction, in which the trailer is located in relation to the vehicle, is determined via signals of the imaging sensor. A distance of the trailer to the vehicle is determined at the same time via signals of the ultrasonic sensors. It is detectable in this way, where the trailer is instantaneously located in relation to the vehicle. In particular, the alignment and position are detectable. In this way, it is ascertainable safely and reliably, whether an object that was detected by the ultrasonic sensors is the trailer itself or an obstacle that is present in the surroundings of the vehicle. It is thus ensured that warnings are only reliably suppressed when they are generated exclusively based on the presence of the trailer.

A width of the trailer and a distance of the trailer to the vehicle are advantageously determined at a trailer angle of 180° and stored in a memory device. The trailer angle corresponds to an angle that assumes a longitudinal axis of the trailer in relation to a longitudinal axis of the vehicle. A normal straight-ahead driving of the vehicle results, for example, in a trailer angle of 180°, since the longitudinal axis of the vehicle and the longitudinal axis of the trailer are aligned in parallel, in particular identical, to one another. If the vehicle is negotiating a curve or driving backward, the trailer angle may be subject to change. It is provided that it is possible to recognize an object detected by the ultrasonic sensors as the trailer based on the data stored in the memory device. The trailer therefore does not require continuous measuring by the imaging sensor and the ultrasonic sensors, but rather it is sufficient for it to be measured once. It is thus easily and economically ascertainable whether an object detected by the ultrasonic sensors is the trailer.

Particularly advantageously, the data stored in the memory device are used to generate a virtual trailer model. The virtual trailer model is superimposed by a surroundings model. The surroundings model is generated based on the ultrasonic sensors. It is detectable in this way whether an object is located in the surroundings of the vehicle. For this purpose, it is only necessary to evaluate the virtual surroundings model. Moreover, it may be recognized whether the object is the trailer. This may be achieved easily and with little effort by establishing, whether the virtual trailer model coincides with an object recognized in the virtual surroundings model. If this is the case, the object must be the trailer.

Particularly advantageously, it is moreover provided that the instantaneous trailer angle is determined with the aid of the imaging sensor. The alignment of the trailer in relation to the vehicle is thus always known. Since only those data with regard to the trailer that refer to a trailer angle of 180° are stored in the memory device, a position and/or an alignment of the virtual trailer model is/are corrected based on the instantaneous trailer angle. The virtual trailer model is thus a true-to-detail image of the position and alignment of the trailer, which is instantaneous at all times. If the virtual trailer model, as described previously, is superimposed by the virtual surroundings model, it is possible to reliably ascertain at all times whether objects in the surroundings of the vehicle are the trailer. This is the case if the superposition of the virtual trailer model by the virtual surroundings model results in one coinciding object within the virtual surroundings model and the virtual trailer model.

The warning signal is advantageously used to activate a braking system of the vehicle and/or to activate an acoustic and/or a visual output unit. On the one hand, the driver is thus made aware of the object, which takes place with the aid of the acoustic and/or visual output unit. On the other hand, the safety of the vehicle itself may be enhanced in that an automatic application of the brakes is carried out. Collisions between objects in the surroundings and the vehicle are thus prevented.

The present invention furthermore relates to a control unit. The control unit is configured to carry out the method described previously. The control unit is advantageously a control unit of a vehicle. For this purpose, the control unit is connected to the ultrasonic sensors as well as to the imaging sensor for the purpose of transferring signals. Moreover, the control unit is advantageously connected to a memory device. Finally, it is advantageously provided that the control unit is connected to a braking system of the vehicle and/or to an acoustic and/or a visual output unit for the purpose of transferring signals.

The present invention finally relates to a vehicle. The vehicle includes a control unit as described previously. Moreover, the vehicle includes a plurality of ultrasonic sensors and at least one imaging sensor. The plurality of ultrasonic sensors and the imaging sensor are connected to the control unit for the purpose of transferring signals. The control unit may thus warn the driver of the vehicle safely and reliably against objects in the surroundings of the vehicle, even though the vehicle is pulling a trailer.

The vehicle is advantageously configured in such a way that the ultrasonic sensors are situated at a rear side. The rear side of the vehicle points in a direction that is opposite to a usual direction of travel of the vehicle. In particular, the ultrasonic sensors are situated at a rearward bumper of the vehicle. The imaging sensor is advantageously a rear view camera. The rear view camera is activated in particular when the driver of the vehicle initiates backward driving. The rear view camera may thus simplify backward driving of the vehicle for the driver. The rear view camera may thus be also active when a trailer is present, so that the trailer may be recognized by the rear view camera. The rear view camera is thus also used to ascertain an instantaneous trailer angle between vehicle and trailer. Using the rear view camera has the advantage that the number of sensors of the vehicle is reduced. It is, however, safely and reliably made possible that the driver is warned against objects in the surroundings.

Exemplary embodiments of the present invention are described in detail below with reference to the attached drawings.

DETAILED DESCRIPTION

Figure 1:
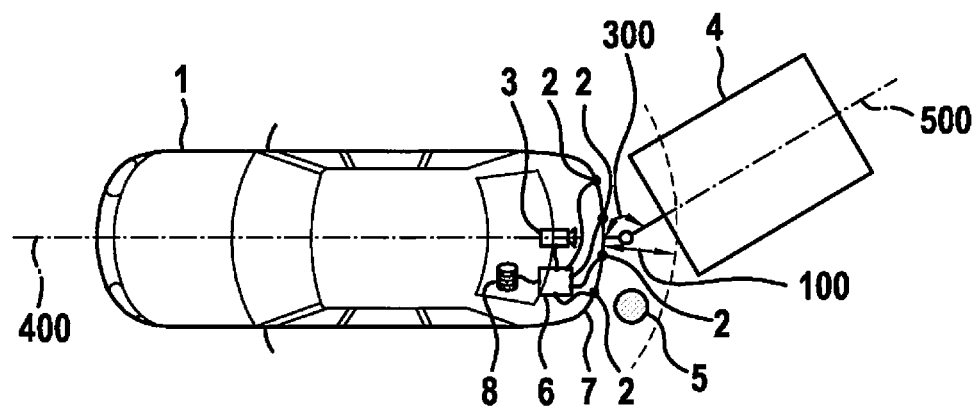
FIG. 1 shows a first schematic view of a vehicle including a control unit according to one exemplary embodiment of the present invention.

FIG. 1 schematically shows a vehicle 1 including a control unit 6 according to one exemplary embodiment of the present invention. Control unit 6 is configured to carry out a method according to one exemplary embodiment of the present invention.

Control unit 6 is coupled to a total of four ultrasonic sensors 2 for the purpose of transferring signals. Moreover, control unit 6 is connected to an imaging sensor 3 for the purpose of transferring signals. Imaging sensor 3 is in particular a rear view camera of vehicle 1. The four ultrasonic sensors 2 are situated at a rearward bumper 7 of vehicle 1. Imaging sensor 3 and ultrasonic sensors 2 are thus used as monitoring sensors for a rearward space of vehicle 1.

Control unit 6 is moreover connected to a memory device 8 for the purpose of transferring signals. Memory device 8 is used to store a position and an alignment of a trailer 4. Trailer 4 is connected to vehicle 1. Trailer 4 is pulled by vehicle 1 in particular. Here, the alignment of trailer 4 may change in relation to vehicle 1.

Vehicle 1 has a longitudinal axis 400. Likewise, trailer 4 has a longitudinal axis 500. An angle between longitudinal axis 400 of vehicle 1 and longitudinal axis 500 of trailer 4 is referred to in the following as trailer angle 300. If vehicle 1 is driving normally straight ahead, trailer angle 300 is in particular 180°.

The position and the size of trailer 4 may be determined with the aid of imaging sensor 3 and ultrasonic sensors 2. Trailer 4 may thus be recognized by imaging sensor 3. An associated distance of trailer 4 from vehicle 1 may theoretically also be ascertained by imaging sensor 3; however, measuring the distance with the aid of ultrasonic sensors 2 may be used for reasons of accuracy. If a width of trailer 4 were to be larger than a width of vehicle 1, the width of trailer 4 would no longer be ascertainable by ultrasonic sensors 2 under certain circumstances. In this case, the width of vehicle 1 is assumed as the width of trailer 4.

Data, from which a virtual trailer model may be generated, are thus present in memory device 8. Information about where trailer 4 is located in relation to vehicle 1 is thus available to control unit 6. Since the data stored in memory unit 8 refer to a trailer 4 that has a trailer angle 300 of 180°, it is advantageously provided that imaging sensor 3 detects a change in trailer angle 300. Therefore, the stored data, in particular with regard to the position and/or alignment of trailer 4, may be corrected. This means that control unit 6 has an instantaneous trailer model available at all times, which displays where trailer 4 is located in relation to vehicle 1.

It is detectable based on ultrasonic sensors 2, whether an object 5 is located behind vehicle 1. For this purpose, ultrasonic sensors 2 scan the space to the rear of vehicle 1. If, via ultrasonic sensors 2, control unit 6 were to recognize an object 5 that has a distance to vehicle 1 smaller than a predefined minimum distance 100, control unit 6 outputs a warning signal. The warning signal may in particular result in an activating of an acoustic and/or a visual warning unit.

As is apparent from FIG. 1, trailer 4 itself may have a distance smaller than predefined minimum distance 100. The mere presence of trailer 4 would thus already result in an outputting of warning signals. It is therefore provided that control unit 6 determines, based on the virtual trailer model, whether a detected object 5 is trailer 4. For this purpose, a virtual surroundings model is prepared based on the data of ultrasonic sensors 2. Objects 5 are thus represented in this virtual surroundings model. The virtual trailer model is subsequently superimposed by the virtual surroundings model. In this way, objects present may be identified as trailer 4. The outputting of warning signals with regard to such objects identified as trailer 4 is subsequently suppressed. At the same time, control unit 6 outputs warning signals when an object 5 was not recognized as trailer 4. In the example shown in FIG. 1, the driver of vehicle 1 would thus receive a warning about object 5, since object 5 is a post in the surroundings that has a smaller distance to vehicle 1 than minimum distance 100. The warning about trailer 4 is suppressed, although trailer 4 has a smallest distance to vehicle 1 that is smaller than minimum distance 100.

Figure 2:
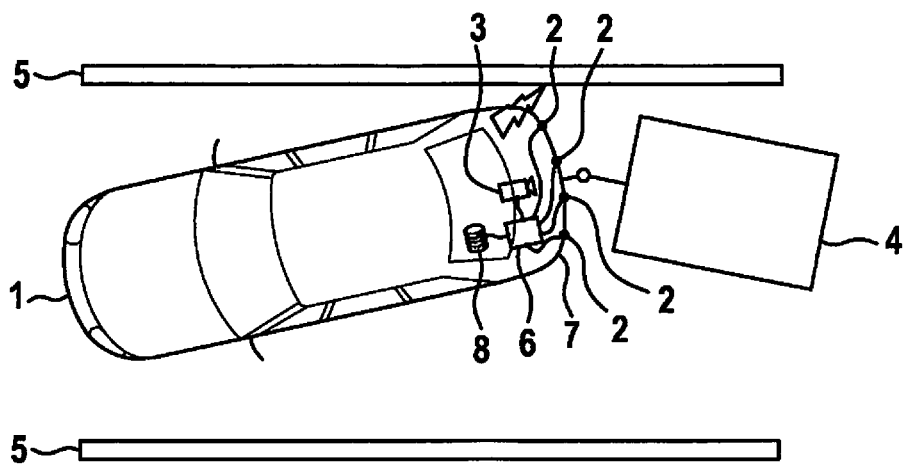
FIG. 2 shows a second schematic view of the vehicle including the control unit according to the exemplary embodiment of the present invention.

FIG. 2 shows one advantageous application of the method according to the present invention. Vehicle 1 is again shown as having control unit 6 from FIG. 1. However, vehicle 1 is in a different driving situation. A driver of vehicle 1 is trying to maneuver vehicle 1 together with trailer 4 into a garage. The side walls of the garage, which are detectable by ultrasonic sensors 2, thus represent objects 5 in the surroundings. In the situation shown in FIG. 2, vehicle 1 is approaching one of objects 5, which means one of the garage walls, so that a warning signal is output by the control unit based on the detection with the aid of ultrasonic sensors 2. Since control unit 6 safely and reliably does not output any warning signals when ultrasonic sensors 2 detect merely trailer 4 itself, the driver of vehicle 1 may rely on the warning, so that the safety is enhanced when driving into the garage as well as when driving out of the garage. The driver is in particular not confused by false warning signals.

Figure 3:
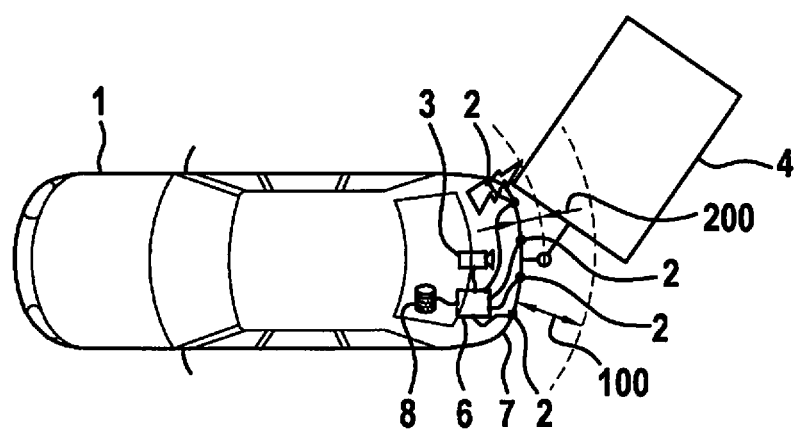
FIG. 3 shows a third schematic view of the vehicle including the control unit according to the exemplary embodiment of the present invention.

FIG. 3 shows another application. Here, the risk of vehicle 1 colliding with trailer 4 itself exists, while driving backward. No other obstacles are otherwise present in the surroundings of vehicle 1. Ultrasonic sensors 2 thus only detect trailer 4. As already described previously, an output of a warning signal by control unit 6 is thus suppressed. However, another distance is defined. If trailer 4 falls below a warning distance 200 to the vehicle the suppression of the warning signal is overruled by control unit 6. A warning signal is thus output.

It is provided that warning distance 200 is such a distance that cannot be reached by trailer 4 during a usual operation. The driver of vehicle 1 is therefore warned only if a collision of vehicle 1 with trailer 4 is in fact imminent. If such a colliding is excluded, there is no warning about trailer 4 recognized with the aid of ultrasonic sensors 2.

In the case shown in FIG. 3, control unit 6 may moreover activate a braking system of vehicle 1. Control unit 6 may thus actively prevent vehicle 1 from colliding with trailer 4. In this way, control unit 6 enhances the safety of vehicle 1 in the case of a risk of colliding with an external obstacle as well as in the case of a risk of colliding with trailer 4 itself. At the same time, erroneous warnings in the case of a lack of risk of a collision are suppressed.

What is claimed is:

1. A method for monitoring surroundings of a vehicle, the method comprising:
   detecting the surroundings behind the vehicle with ultrasonic sensors and with at least one imaging sensor;
   outputting a warning signal when an object that has a distance to the vehicle smaller than a predefined minimum distance is detected with the ultrasonic sensors; and
   recognizing a trailer of the vehicle with the imaging sensor and based on a virtual trailer model, wherein the virtual trailer model is superimposed by a surroundings model generated with the ultrasonic sensors;
   wherein the warning signal is not output when the object is the trailer recognized by the imaging sensor,
   wherein data stored in a memory device are used to generate the virtual trailer model and to recognize the object in the surroundings of the vehicle as the trailer.

2. A method for monitoring surroundings of a vehicle, the method comprising:
   detecting the surroundings behind the vehicle with ultrasonic sensors and with at least one imaging sensor;
   outputting a warning signal when an object that has a distance to the vehicle smaller than a predefined minimum distance is detected with the ultrasonic sensors; and
   recognizing a trailer of the vehicle with the imaging sensor and based on a virtual trailer model;
   wherein the warning signal is not output when the object is the trailer recognized by the imaging sensor,
   wherein a warning signal is output when it is detected with the ultrasonic sensors that a distance of the object is smaller than a warning distance which is smaller than the minimum distance, and the object is the trailer recognized by the imaging sensor.

3. A method for monitoring surroundings of a vehicle, the method comprising:
   detecting the surroundings behind the vehicle with ultrasonic sensors and with at least one imaging sensor;
   outputting a warning signal when an object that has a distance to the vehicle smaller than a predefined minimum distance is detected with the ultrasonic sensors; and
   recognizing a trailer of the vehicle with the imaging sensor;
   wherein the warning signal is not output when the object is the trailer recognized by the imaging sensor,
   wherein a direction, in which the trailer is located in relation to the vehicle, is determined by signals of the imaging sensor, while a distance between the trailer and the vehicle is determined via signals of the ultrasonic sensors.

4. A method for monitoring surroundings of a vehicle, the method comprising:
   detecting the surroundings behind the vehicle with ultrasonic sensors and with at least one imaging sensor;
   outputting a warning signal when an object that has a distance to the vehicle smaller than a predefined minimum distance is detected with the ultrasonic sensors; and
   recognizing a trailer of the vehicle with the imaging sensor;
   wherein the warning signal is not output when the object is the trailer recognized by the imaging sensor, wherein a width of the trailer and a distance between the trailer and the vehicle at a trailer angle of 180°, which is measured between a first longitudinal axis of the vehicle and a second longitudinal axis of the trailer, is determined and stored in a memory device, so that a recognition of an object detected by the ultrasonic sensors as the trailer is provided based on the data stored in the memory device.

5. The method of claim 4, wherein the data stored in the memory device are used to generate a virtual trailer model that is superimposed by a virtual surroundings model generated with the ultrasonic sensors, to recognize an object in the surroundings of the vehicle as the trailer.

6. The method of claim 5, wherein an instantaneous trailer angle is determined between a vehicle longitudinal axis and a trailer longitudinal axis with the imaging sensor to correct a position and/or an alignment of the virtual trailer model based on the instantaneous trailer angle.

7. The method of claim 1, wherein the warning signal is used to perform at least one of: (i) activating a braking system of the vehicle, and/or (ii) activating an acoustic output unit and/or a visual output unit.

8. A vehicle, configured for monitoring surroundings of the vehicle, by performing the following:
   detecting the surroundings behind the vehicle with ultrasonic sensors and with at least one imaging sensor;
   outputting a warning signal when an object that has a distance to the vehicle smaller than a predefined minimum distance is detected with the ultrasonic sensors; and
   recognizing a trailer of the vehicle with of the imaging sensor and based on a virtual trailer model, wherein the virtual trailer model is superimposed by a surroundings model generated with the ultrasonic sensors;
   wherein the warning signal is not output when the object is the trailer recognized by the imaging sensor,
   wherein data stored in a memory device are used to generate the virtual trailer model and to recognize the object in the surroundings of the vehicle as the trailer.

9. A vehicle, comprising:
   a plurality of ultrasonic sensors and at least one imaging sensor and configured for monitoring surroundings of the vehicle, by performing the following:
   detecting the surroundings behind the vehicle with the plurality of ultrasonic sensors and with the at least one imaging sensor;
   outputting a warning signal when an object that has a distance to the vehicle smaller than a predefined minimum distance is detected with the ultrasonic sensors; and
   recognizing a trailer of the vehicle with of the imaging sensor and based on a virtual trailer model, wherein the virtual trailer model is superimposed by a surroundings model generated with the ultrasonic sensors;
   wherein the warning signal is not output when the object is the trailer recognized by the imaging sensor,
   wherein data stored in a memory device are used to generate the virtual trailer model and to recognize the object in the surroundings of the vehicle as the trailer.

10. The vehicle of claim 9, wherein the ultrasonic sensors are situated at a rear side of the vehicle, and/or the imaging sensor is a rear view camera.

11. The vehicle of claim 9, wherein the ultrasonic sensors are situated at a rear side of the vehicle, in particular in a rear bumper of the vehicle, and/or the imaging sensor is a rear view camera.

\* \* \* \* \*